Jan. 16, 1945.  P. C. NILLES  2,367,425
DUMPING VEHICLE
Filed July 26, 1940
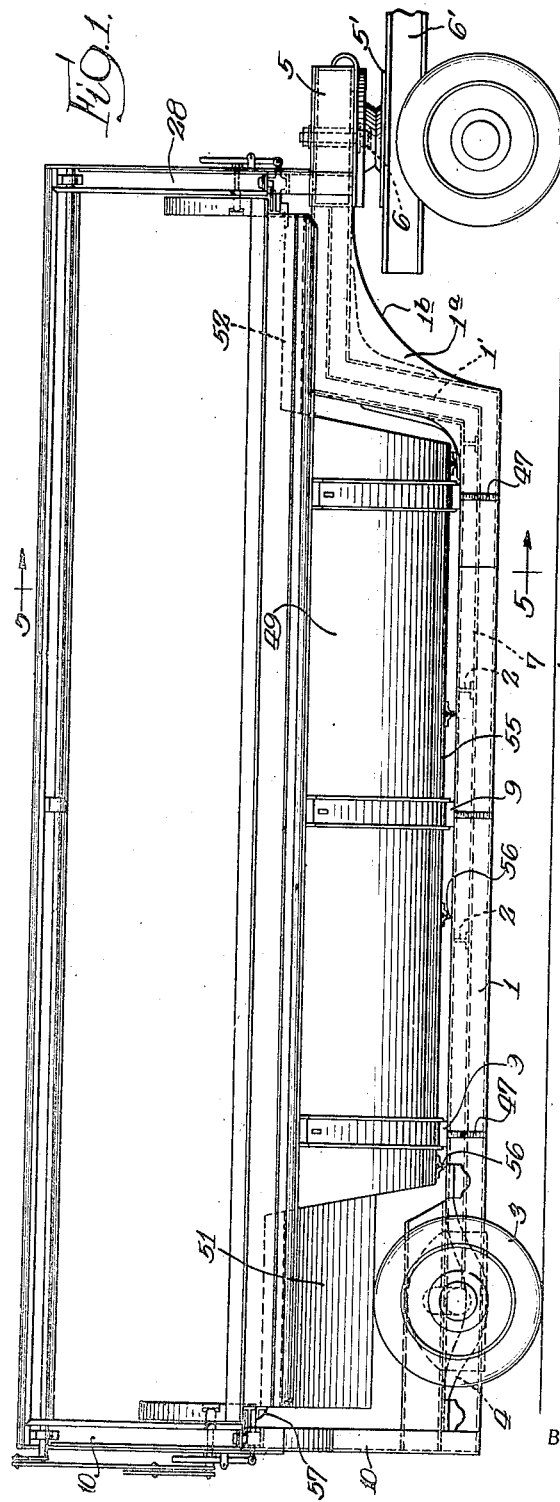
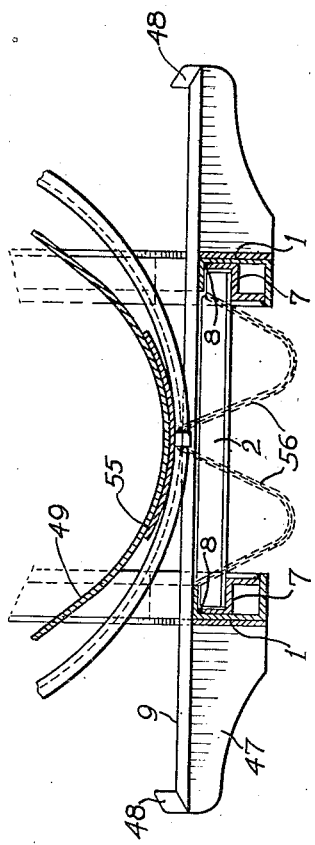
INVENTOR.
Philip C. Nilles,
W. F. Kellogg.
ATTORNEY.

Patented Jan. 16, 1945

2,367,425

UNITED STATES PATENT OFFICE 2,367,425

DUMPING VEHICLE

Philip C. Nilles, Chicago, Ill.

Application July 26, 1940, Serial No. 347,681

6 Claims. (Cl. 280—106)

This invention relates to improvements in dumping vehicles and, more especially, to that type of vehicle wherein dumping of its hopper or body is effected by sidewise rocking or rolling movement of the same to predetermined or dumping positions, thence, back to a central or loading position, the invention having for an object to provide the vehicle with a chassis or frame so constructed as to accord a maximum of strength thereto and to render it entirely capable of successfully withstanding the extremely rough treatment to which such vehicles, during normal usage, are subjected, as well as to satisfactorily withstand the comparatively violent stresses and torsional strains imparted thereto during such usage.

Other objects of the invention will be in part obvious and in part pointed out hereinafter.

In order that the invention and its mode of operation may be readily understood by workers skilled in the art to which it appertains, I have, in the accompanying illustrative drawing and in the detailed following description based thereupon, set out one embodiment of my invention.

In the drawing:

Figure 1 is a side elevation of my improved dumping vehicle and

Figure 2 is a vertical transverse section taken on the line 5—5 of Figure 1, looking in the direction in which the arrows point.

Having more particular reference to the drawing, in connection with which like characters of reference will designate corresponding parts throughout, the improved vehicle may be stated to comprise a frame including side channels or bars 1, portions of which are offset or dropped, as at 1', whereby to provide a lowered center of gravity for the vehicle, or what is generally identified in the art as a drop frame; the side bars 1 being fixedly interconnected through the medium of cross bars, generally identified by the numeral 2, arranged with relation and connected to said side bars in a manner which will be presently described. The offset portions 1' of the side bars 1, as will be understood, will receive considerable shock and stress during but normal usage of the dump vehicle and, by consequence, it is highly important that these particular portions of said side bars shall be strengthened to the utmost. Accordingly, I engage over the outer side of the offset portions 1' of the side bars 1, angle braces or knees, each generally indicated by the numeral 1ª and each comprising Z-shaped forged metal pieces, the extremities of which are fixedly connected to adjacent portions of their respective side bars 1, whereas the intermediate portions thereof, i. e., those portions lying in proximity to the offset portions 1' of said side bars 1, are connected to such offset portions and are materially widened and have their inner marginal edges of substantially arc-like formation, as indicated at 1ᵇ, whereby to provide a maximum of rigidity and strength thereto, particularly to the said offset portions 1' of the several side bars 1, which are in co-axial alignment with the line of connection between the dump vehicle traction means and its fifth wheel upper half 5.

Wheels, preferably arranged in paired or double-treated relationship and identified by the numeral 3, are suitably mounted upon the normally rearward portion of the vehicle frame, preferably being provided with a suitable type of spring mounting, such as generally indicated by the numeral 4, for obvious reasons. The forward or upwardly offset end portion of the drop frame is provided with an extension 5 equipped with a coupling pintle 6 or the like, and serves as the upper half of a fifth wheel, the same being engageable with the lower half of a fifth wheel (not shown) carried upon a wheel truck (also not shown) adapted to be engaged under and to movably support said forward end of the frame, the wheels of which, as will be understood, underlie the upwardly offset forward portion of said frame and are accorded ample clearance as between themselves and such frame, whereby to permit dirigibility of the vehicle. Incidentally, the draft or pulling means engaging under and supporting said forward end of the vehicle frame and not shown herein, may be a tractor or other type of automatic draft means, or the same may be a wheeled truck or draft dolly adapted to be horse-drawn.

The side bars 1 are formed from lengths of channel metal set upon their sides and faced inwardly with respect to each other. Received or nested within said channel bars are cross-sectionally substantially Z-shaped bars 7, the same being welded to adjacent portions of their respective channel bars 1, as indicated at 8, and thus becoming a substantially integral part of the latter. The intermediate web portions of the Z-shaped bars 8, as will be noted, are disposed within the channels of said bars 1 intermediately of the same and, by consequence, provide such side bars with horizontal supporting means or shoulders. These horizontal supporting means or shoulders receive directly thereupon the opposite extremities of the heretofore referred to cross bars 2, which may be of cross-sectionally T-shaped formation, and suitable securing means are then passed through adjacent portions of the cross bars 2 and the horizontal web portions of the Z-shaped bars 7, whereby to securely interconnect the same. Other cross bars, generally identified by the numeral 9, are arranged in equi-spaced relationship upon the upper sides of the side rails 1 and are appropriately secured thereto. These cross bars 9 serve as rails or tracks upon which the vehicle dumping hopper, hereinafter more fully described, is adapted to have rolling or rocking bearing engagement and, incidentally, it will be here noted that said cross bars or rails 9 are of substantially cross-sectionally T-shaped formation and are arranged in inverted positions with relationship to the cross bars 2, hence, providing for the horizontally disposed rails or track portions aforesaid.

The equi-spaced rails 9, hereinbefore described, as will be noted, are carried upon the drop portion of the vehicle frame and are transversely disposed with relation thereto. The lengths of the rails are uniform and are considerably greater than the width of the vehicle frame as represented by the side bars 1. Hence, it will be seen that said rails 9 extend for corresponding distances beyond the opposite sides of the frame, particularly the side rails 1. Bracing or supporting elements 47 are provided the laterally extended ends of each of the rails 9, that is, those portions of the rails which extend beyond the oppositely disposed side bars 1 are suitably secured to adjacent portions of said side rails and effectually connected to those extended portions of the rails 9 seated or bearing thereupon. Upwardly extending lips or stops 48 are fixedly carried upon the extreme outer ends of each of the rails 9 and serve as means for limiting rolling movement of the vehicle hopper, to be presently described, hence, preventing excessive movement thereof during a dumping operation.

A hopper generally indicated by the numeral 49 is provided the vehicle frame, having a rounded bottom and inclined side and end walls, the opposite ends of said hopper being provided with longitudinal extensions 51 and 52, which, as will be noted upon reference to Figure 1, respectively overlie the rearward end of the frame and the rear wheels 3, and the offset forward portion of the frame. The hopper 49 is rockably mounted upon the intermediate portion of the vehicle frame, being equipped with cradling rockers, as shown, whose downwardly opening channeled faces have engagement with the adjacent transversely disposed rails 9. Standards or uprights 10 and 28 are fixedly mounted upon the opposite ends of the vehicle frame and serve to support cover or top frame means (see Figure 1). Chains 56 are connected at their opposite ends to portions of the opposed side bars 1 of the vehicle frame and to portions of the hopper bottom for limiting rocking movement of the hopper.

By reason of the novel and hereinbefore explained construction of the side bars 1 of the frame, I am enabled to provide such frame with materially greater shock and stress resistance or strength, permitting its usage over a prolonged period of time, subject to the many times violent conditions of such usage, without breakage or similar disability. Also, by reason of the mode of bracing the normally forward and offset portions of the side rails 1 with the hereinbefore described knees 1a, it will be understood that longitudinal and torsional stresses and strains imparted to the vehicle frame from its traction medium will be effectually resisted and absorbed thereby.

Manifestly, the construction shown is capable of further modification, and such modification as is within the scope of my claims, I consider within the spirit of my invention.

I claim:

1. A vehicle frame including relatively spaced side bars formed from lengths of inwardly facing channel metal, and substantially Z-shaped bars fixedly carried thereby within their channel portions, the horizontal portions of which are disposed intermediately of said channel portions, and cross bars connected at their opposite ends to said side bars and bearing upon the horizontal portions of said Z-shaped bars.

2. A vehicle frame, including relatively opposed and spaced side bars formed from lengths of inwardly facing channel metal, supporting bars nested in the channel portions thereof and fixedly carried thereby said supporting bars having intermediate horizontal portions, and cross bars connected at their opposite ends to said side bars and bearing upon the horizontal portions of said nested supporting bars.

3. A vehicle frame, including relatively spaced side bars consisting of lengths of inwardly facing channel metal, substantially Z-shaped bars nested in the channel portions of said side bars and fixedly carried thereby, the horizontal portions of which are disposed between the upper and lower sides of said channel portions, and cross bars having their opposite ends bearing directly upon the horizontal portions of said Z-shaped bars and fixedly connected to the same.

4. A vehicle frame, including relatively spaced side bars formed from lengths of inwardly facing channel metal, cross-sectionally angularly shaped bars nested within the channel portions of said side bars and disposed in substantial parallelism thereto and fixedly connected to the same, intermediate portions of said cross-sectionally angularly shaped bars being disposed in horizontal planes and extended longitudinally throughout the same, and cross bars having their opposite ends bearing upon the horizontal portions of said cross-sectionally angularly shaped bars and connected thereto.

5. In a vehicle, a wheeled frame, including relatively spaced side bars consisting of lengths of inwardly facing channel metal, cross-sectionally angularly shaped bars nested in the channel portions of said side bars and fixedly carried thereby, said cross-sectionally angularly shaped bars having horizontal portions disposed between the upper and lower sides of the channel portions of the side bars, cross bars having their opposite ends bearing directly upon the horizontal portions of said cross-sectionally angularly shaped bars and fixedly connected to the same, the normally forward portions of said side bars being upwardly offset with respect to the remainders thereof, and bracing means substantially conforming in shape to the offset formation of said side bars and portions of the same adjacent thereto fixedly connected to said side bars adjacent such offset and adjacent portions thereof.

6. A vehicle frame, including relatively spaced side bars consisting of lengths of inwardly facing channel metal, the normally forward portions of said side bars being upwardly offset with respect to the body portions thereof and disposed in substantial parallelism thereto, substantially Z-shaped bracing means fixedly secured to said offset portions of the side bars and to the relatively parallel adjacent portions thereof, said bracing means being medially widened and formed with arcuate inner marginal portions, cross-sectionally angularly shaped bars nested in the channel portions of said side bars and extending throughout their respective lengths and fixedly carried thereby, said cross-sectionally angularly shaped bars having horizontal portions which are disposed between the upper and lower sides of the channel portions of the channel side bars, and cross bars having their opposite ends bearing directly upon the horizontal portions of said cross-sectionally angularly shaped bars and fixedly connected thereto.

PHILIP C. NILLES.